UNITED STATES PATENT OFFICE.

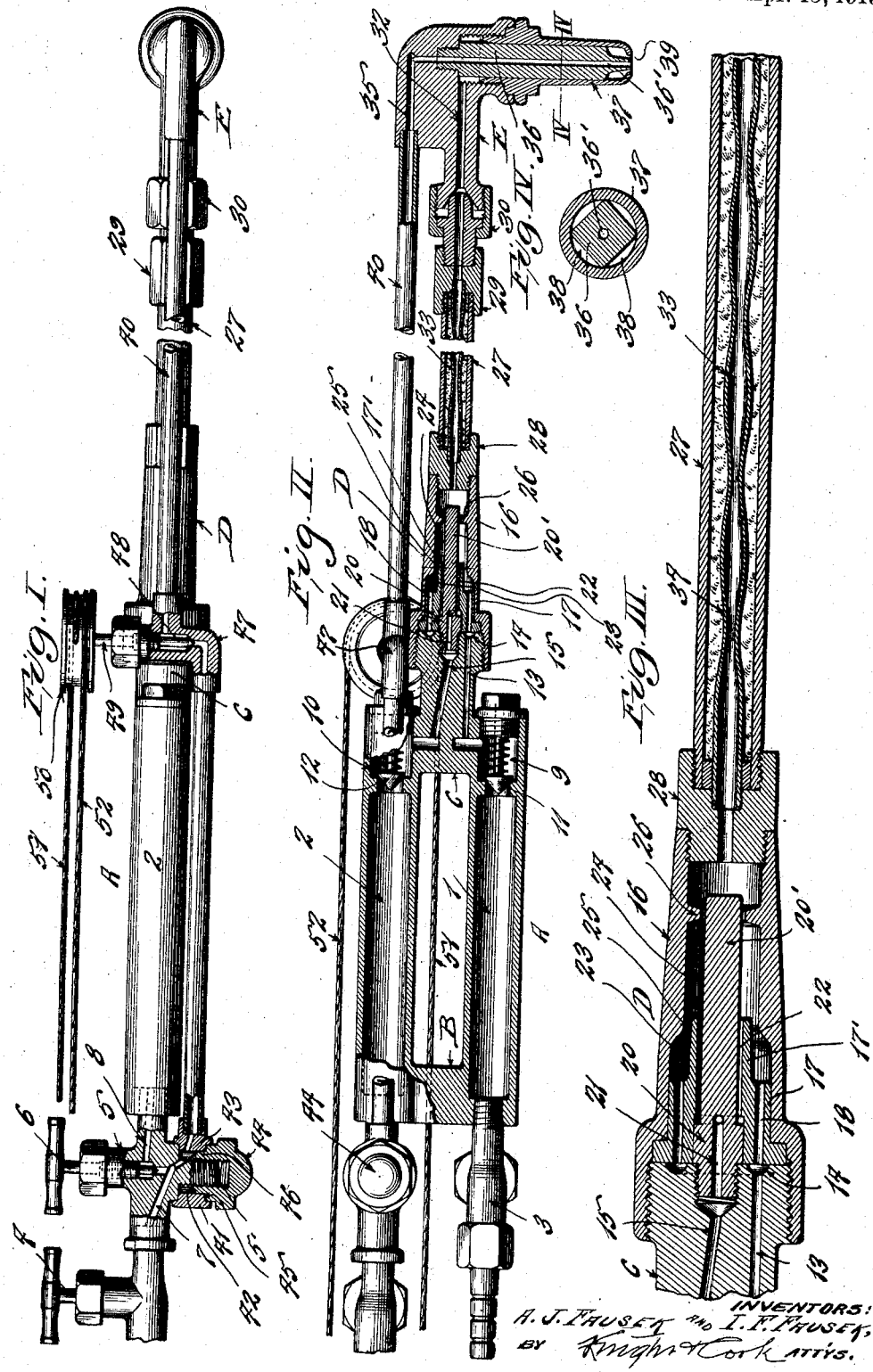

ARTHUR J. FAUSEK AND IRWING F. FAUSEK, OF ST. LOUIS, MISSOURI.

TORCH.

1,300,256.  Specification of Letters Patent.  Patented Apr. 15, 1919.

Application filed August 2, 1915. Serial No. 43,187.

*To all whom it may concern:*

Be it known that we, ARTHUR J. FAUSEK and IRWING F. FAUSEK, citizens of the United States of America, residents of the city of St. Louis, State of Missouri, have invented certain new and useful Improvements in Torches, of which the following is a full, clear, and exact description, reference being had to the accompanying drawings, forming a part of this specification.

Our invention relates to a torch for use in welding or cutting metals through the medium of an oxy-acetylene flame, the present invention having for its main object to provide as nearly as possible a perfect admixture of acetylene and oxygen in a mixing chamber prior to their delivery to the tip of the torch. By acquiring the most perfect admixture we are enabled to produce a better and hotter flame, and avoid interruption in the burning of the flame due to different causes, as for example backfiring. Other features of our invention will hereinafter appear.

Figure I is a top or plan view of our torch in condition for use in metal cutting operations.

Fig. II is a longitudinal section through the torch as shown in Fig. I.

Fig. III is an enlarged longitudinal section through the mixing head and the insulated mixed gas conductor leading therefrom.

Fig. IV is an enlarged cross section taken on line IV—IV, Fig. II through the tip of the torch.

In the accompanying drawings

A designates the handle of our torch which includes an acetylene reservoir 1 and an oxygen reservoir 2 joined at their forward ends by a head C through which acetylene and oxygen are delivered to the mixing head of the torch.

An acetylene supply pipe is connected to the handle reservoir 1, and an oxygen supply pipe is connected to the handle reservoir 2, the said pipes having communication with the rear ends of said reservoirs.

In the acetylene pipe is a valve housing 3.

In the oxygen pipe are valve housings 4 and 5, the latter containing a cut-off valve 6. The valve housing 5 contains a duct 7 extending diagonally from its rear end to the valve chamber in said housing located at its side opposite that at which the stem of the valve 6 enters. The housing 5 also contains a duct 8 leading forwardly from said valve chamber to the handle reservoir 2.

A valve 4 permits of the cutting off of the delivery of oxygen to the valve housing 5.

At the forward ends of the acetylene and oxygen reservoirs, respectively, are check valve chambers, 9 and 10 containing check valves 11 and 12 which permit flow of acetylene and oxygen into the check valve chambers, and therefrom through handle head C to the mixing chamber of the torch in front of said reservoir, but prevent back flow of the gases.

The handle head C contains an aceytlene conducting channel 13 extending from the check valve chamber 9 to an annular pocket 14 at the front end of the head C; and an oxygen conducting channel 15 leading from the check valve chamber 10 to a point approximately central of the diameter of the handle head C at its forward end.

D designates the mixing head, the shell 16 of which is removably secured to the handle head C.

Within the rear portion of the mixing head shell is an outer inlet ring 17, the rear end of which rests against the front end of the handle head C. This inlet ring contains any desired number of ducts 18 which communicate with the annular pocket 14 at the front end of the head C, and provide for the delivery of acetylene to the chamber of the mixing head.

20 designates an inner inlet member fitted centrally to the handle head C. This inner inlet member contains a duct 21 in communication with the oxygen channel 15 in the head C through which oxygen is delivered to the chamber of the mixing head D. The inner inlet member 20 is provided with a forwardly extending stem 20' between which and the outer inlet ring 17, is an annular channel 22, and the outer inlet ring has a forwardly extending neck 17' through which the annular channel 22 also extends. The duct 21 in the inner inlet member extends first longitudinally in the said member, and then transversely to provide for the delivery of oxygen into the annular channel 22. The mixing chamber into which the acetylene and oxygen are delivered is subdivided into inter-communicating compartments 23 and 24, the compartment 23 being rearmost and being of greater diameter than the compartment 24. At the front end of the compartment 23 is a contracted throat 25 which is located back of the front end of the neck 17' of the outer inlet ring 17.

Acetylene enters the compartment 23 of the mixing chamber by passing through the ducts 18 in the outer inlet ring 17, and is delivered from said compartment into the compartment 24 by passing through the annular throat 25. Oxygen is admitted to the mixing chamber by passing through the duct 21 and annular channel 22 and the gases are mixed in the compartment 24. It will be seen that by the construction set forth, each gas is delivered in sheet form into the compartment 24, and that there is superior opportunity for mixture of the gases, as compared with delivery of one or both of the gases into the mixing chamber in a solid stream as is usual in oxy-acetylene torches.

The shell 16 of the mixing head D contains an internal annular rib 26 surrounding and spaced from the stem 20' of the inner inlet member 20 and serving as a baffle by which the gases are restrained in their escape from said compartment, thereby facilitating mixture of the gases.

It is highly essential that the acetylene and oxygen should be mixed as thoroughly as possible and to provide for more complete mixture than occurs in the mixing chamber of my torch, I provide a mixed gas conductor leading from the mixing head to the tip head by which more complete admixture is accomplished. 27 designates the shell of the mixed gas conductor which is joined by a coupling 28 to the front end of the mixing head shell 16. The shell 27 is connected by suitable couplings, such as those 29 and 30, to the tip head E containing a channel 32 into which the mixed gases are delivered. Within the shell 27, and preferably insulated therefrom, is a conducting tube 33 which is contracted at intervals to produce throats 34 of less diameter than the remainder of the tube, and as the gases pass through these their flow is retarded thereby causing them to be more thoroughly commingled with each other.

The tip head E is intended for use in my torch when the torch is used for metal cutting operations and it contains, besides the duct 32, a second duct 35 through which an auxiliary supply of oxygen may be delivered to the tip of the torch. The tip of the torch comprises an inner member 36 having a central longitudinal duct 36' therein, and an outer member 37 surrounding the inner member and spaced therefrom, as seen in Fig. IV, said members being of different cross section to furnish passageways 38 leading to the outlet 39 at the outer end of the inner tip member 36.

Additional supply of oxygen is delivered to the tip head E through an auxiliary supply pipe 40 leading from the valve housing 5 in the main oxygen supply pipe to the duct 35 in the tip head E. At the rear end of the auxiliary supply pipe is an annular coupling member 41 which is fitted to the valve housing 5 around the threaded stem 5' at the side of the housing opposite that through which the stem of the valve 6 extends. The coupling member 41 is spaced from the threaded stem 5' to provide an oxygen receiving chamber 42, and oxygen entering said chamber from the duct 7, passes therefrom through a duct 43 in the coupling member to the auxiliary oxygen supply pipe. The annular coupling member 41 is held in position against the valve housing 5 by a nut fitted to the threaded stem 5' and having a seat 45 which engages the outer side of the coupling member 41 to clamp it between said nut and the body of the valve housing 5 around said stem. At the inner end of the nut 44 is a neck 46 which serves to close the duct 7 when the auxiliary supply pipe is disconnected from the torch to adapt the torch for welding operations.

47 designates a valve housing in the auxiliary oxygen supply pipe 40. This valve housing contains a valve 48 having a valve stem 49 provided with an operating wheel 50. The valve 48 serves to control the passage of oxygen to the tip of the torch and it may be operated by direct application of the hand of the user to the operating wheel 50. It is sometimes necessary to apply the torch to an object to be cut which is at too great a distance from the operator to permit of his grasping the operating wheel during the cutting operation. We therefore provide for the operation of the said wheel, in such an instance, by furnishing the wheel 50 with a flanged rim and connect to said wheel two operating cords 51 and 52 which extend around the wheel in opposite directions. These cords may be of any desired lengths and by pulling upon them the operator may open and close the valve 48 at will.

Our torch may be readily suited for welding operations by removing the auxiliary oxygen supply pipe 40 and the tip head E with its tip, and substituting for the latter a tip head having only a single duct into which the mixed gas is delivered. Then by applying a welding jet tip to said head the torch is in condition for welding operations.

We claim:—

1. In a torch, a head having two gas conducting channels therein leading to the forward end of the head, a mixing chamber shell secured to the forward end of said head, an inner member located centrally within said shell, said inner member containing a duct in communication with one of the channels in said head and extending laterally through the inlet member at a point near its rear end, a ring within said shell surrounding said inner member and having a duct therein communicating with the second channel in said head, said ring being spaced from said inner member to provide an inner annular gas conducting channel leading from the duct in said inner member and being spaced from said mixing chamber shell to provide an outer annular channel through which the gas passing through said ring may pass to mingle with the gas passing from the inner annular gas conducting channel to the mixing chamber in front of said ring.

2. In a torch, a head having two gas conducting channels therein leading to the forward end of the head, a mixing chamber shell secured to the forward end of said head, an inner member located centrally within said shell, said inner member containing a duct in communication with one of the channels in said head and extending laterally through the inlet member at a point near its rear end, a ring within said shell surrounding said inner member and having a duct therein communicating with the second channel in said head, said ring being spaced from said inner member to provide an inner annular gas conducting channel leading from the duct in said inner member and being spaced from said mixing chamber shell to provide an outer annular channel through which the gas passing through said ring may pass to mingle with the gas passing from the inner annular gas conducting channel to the mixing chamber in front of said ring, said inner member being extended beyond said ring and being surrounded by an annular baffle serving to retard the flow of the mixed gases from the mixing chamber.

3. In a torch having a tip, the combination of gas mixing means having communication with the tip of the torch, supply pipes for delivery of acetylene and oxygen to said mixing means, a valve housing in said oxygen supply pipe, a valve in said housing, the said valve housing having a duct therein leading to one of its sides, and being provided with a screw threaded stem, an annular coupling member surrounding said screw threaded stem and having a chamber therein into which oxygen is delivered from said duct, a nut adapted to hold said coupling member against said valve housing and also adapted to close said duct when the coupling member is removed from the valve housing, and a pipe leading from said coupling member for delivering an auxiliary supply of oxygen to the tip of the torch.

4. In a torch having a tip, the combination of a main oxygen supply pipe, a valve housing in said supply pipe, means for delivering a main supply of oxygen from said valve housing to the tip of the torch, the said valve housing being provided at one of its sides with a screw threaded stem and having a duct therein leading laterally through said stem, an annular coupling member surrounding said screw threaded stem and spaced therefrom to provide a chamber with which said duct communicates, a nut closing the outer end of said annular coupling member, and a pipe leading from said coupling member to the tip of the torch, the said nut being adapted to close the duct in said screw threaded stem when the coupling member is separated from said valve housing.

ARTHUR J. FAUSEK,
IRWING F. FAUSEK.